United States Patent [19]  
Challandes

[11] Patent Number: 4,976,155  
[45] Date of Patent: Dec. 11, 1990

[54] FLUIDIC FLOWMETER

[75] Inventor: Claude Challandes, Sonceboz, Switzerland

[73] Assignee: Sontex, S.A., Sonceboz, Switzerland

[21] Appl. No.: 411,460

[22] PCT Filed: Dec. 5, 1988

[86] PCT No.: PCT/GB88/01057  
§ 371 Date: Sep. 21, 1989  
§ 102(e) Date: Sep. 21, 1989

[87] PCT Pub. No.: WO89/05441  
PCT Pub. Date: Jun. 15, 1989

[30] Foreign Application Priority Data  
Dec. 4, 1987 [GB] United Kingdom ................ 8728468

[51] Int. Cl.$^5$ .............................................. G01F 1/20  
[52] U.S. Cl. .................. 73/861.19; 137/826; 137/833  
[58] Field of Search ............... 73/861.19; 137/826, 137/833, 835

[56] References Cited  
U.S. PATENT DOCUMENTS 3,605,778 9/1971 Metzger ................... 73/861.19 X  
3,802,283 4/1974 Bahrton ..................... 73/861.19  
4,085,615 4/1978 Haefner et al. ............ 73/861.19  
4,838,091 6/1989 Markland et al. ......... 73/861.19

Primary Examiner—Herbert Goldstein  
Attorney, Agent, or Firm—Larson & Taylor

[57] ABSTRACT

A fluidic flowmeter is provided for measuring fluid flow comprising an inlet nozzle, a chamber and splitter located on a centerline with a feedback channel on each side of the chamber with the channel inlet disposed on each side of the apex of the splitter. An outlet channel is disposed on each side of the chamber with the apex of the feedback channel inlet disposed between the outlet channel and the feedback channel. The distance from the mouth of the nozzle to the splitter is greater than the distance between the mouth of the nozzle to the apex between the feedback channel and the outlet channel to provide improved uniformity and sensitivity in measuring fluid flow.

10 Claims, 4 Drawing Sheets

U.S. Patent  Dec. 11, 1990  Sheet 1 of 4  4,976,155
FIG. 1
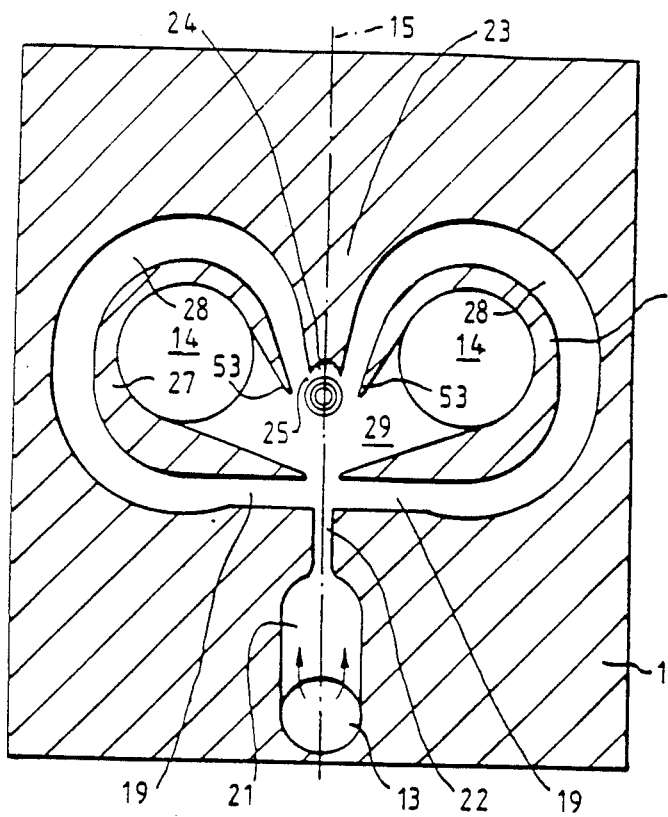
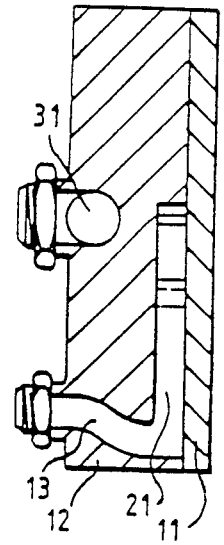
FIG. 2
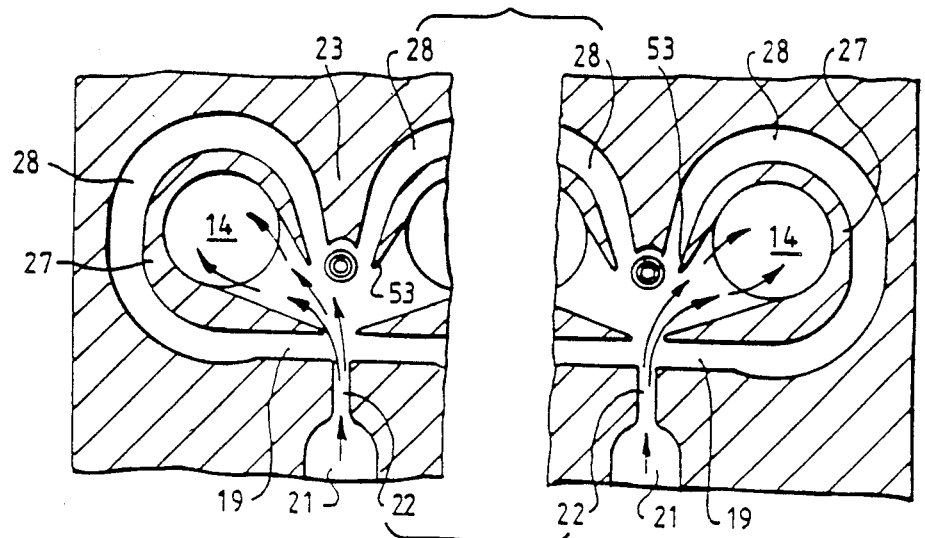
FIG. 3

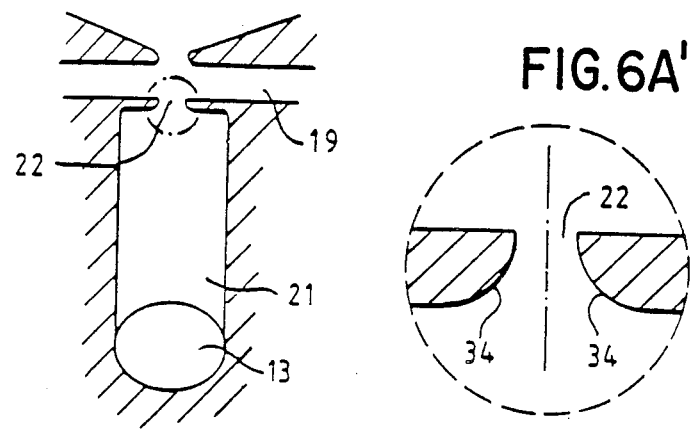
FIG. 6A
FIG. 6A'
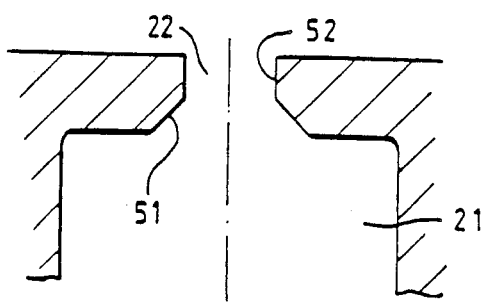
FIG. 6B
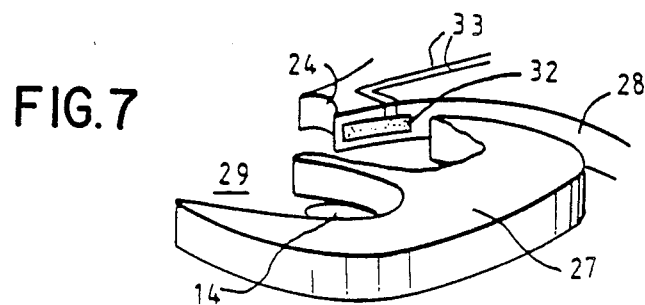
FIG. 7

FIG. 8
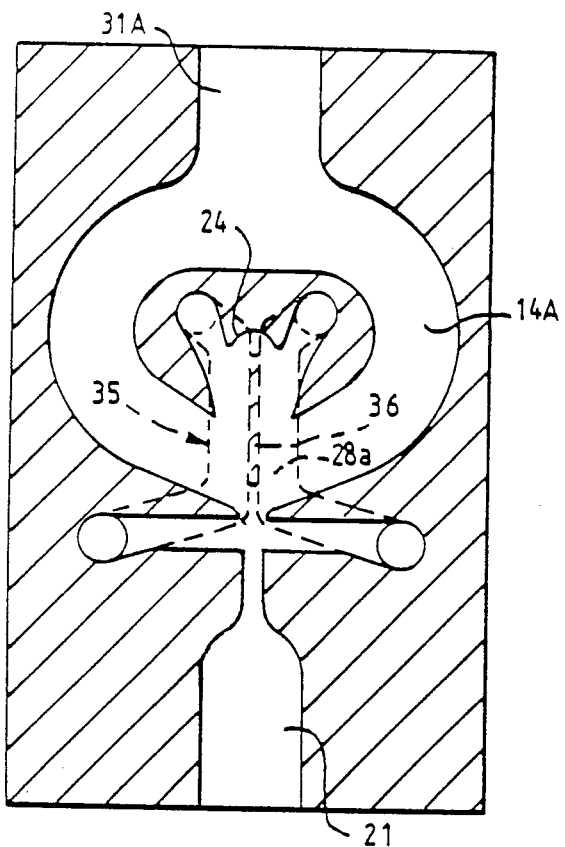
FIG. 9
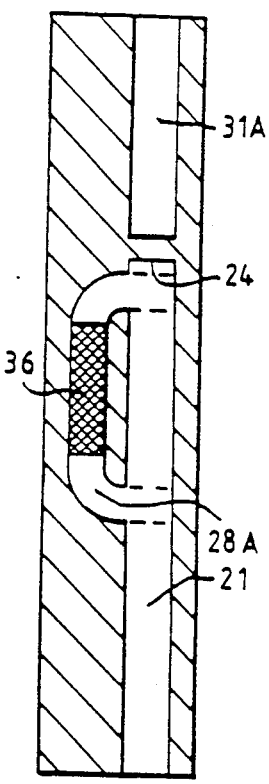
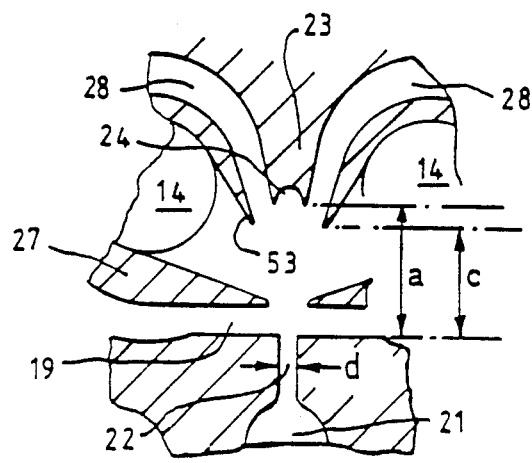
FIG. 10

FLUIDIC FLOWMETER

This invention relates to flowmeters and flowsensors of the type utilising a fluid oscillator so arranged so that the frequency of oscillation is indicative of the flow rate being measured or indicated.

One such flowmeter is disclosed in GB-A-1 593 680 in which fluid flows through a nozzle on the centre line of a chamber which is divided by a splitter on its centre line and a C-shaped member divides each half of the divided chamber into an outer passage and a central region. If the jet from the nozzle passes on one side of the splitter facing the nozzle, it will flow into the outer passage which forms a feedback loop on that side of the chamber to arrive in a transverse direction across the mouth of the nozzle, thus urging fluid emerging from the nozzle towards the other side of the splitter so that the fluid flow then switches to the other half of the chamber. The frequency of switching is a function of the rate of flow. Transducers in the feedback conduits sense the pressure and flow perturbations to give an indication of the volumetric flow rate. All the components so far described lie in a common plane, but outlets from each of the central regions extend out of the plane to a common outlet from the device.

In GB-A-1 593 680 the chamber is divided by an approximately V-shaped splitter with a sharp apex. The apex of the splitter and the apices of the wall dividing the feedback and output channels are all at the same distance from the nozzle. The outlet conduits are separated from the splitter by the feedback channels. This is important, since as the jet deviates from the centre line of the apparatus, the first channel it passes into is the feedback channel. If the feedback channel is separated from the splitter by the outlet channel, the main flow variation from the jet will first affect the outlet and the device will be less sensitive than if the feedback channel is defined by the splitter side wall. Another parameter which affects sensitivity is the length of the feedback channel, and here it is long because it has to pass right around the outlet channel.

We have found that the relative positions of the apices of the splitter and the walls separating the feedback and output channels are important. The distance between the splitter and the apices between the outlet and feedback channels measured along the centre line of the meter from the mouth of the nozzle is preferably between 1 and 4 times the width of the nozzle. We have found that this last range gives greatest sensitivity at the lowest Reynolds numbers coupled with uniformity of response for different Reynolds numbers. The distance from the apices between the outlet and feedback channels measured along the centre line of the meter from the mouth of the nozzle is preferably between 5.6 and 12.0 times the width of the nozzle.

An optional feature of the invention is the passage of the feedback channels out of the common plane as mentioned above and back to that plane again. This enables the outlet conduits to remain in the common plane while passing from the inside to the outside of the feedback loop, and to join up into a single outlet conduit beyond the splitter while still in that plane. With this arrangement the feedback channels can run on either side of a differential pressure transducer whose output will give an indication of the frequency of variation of the flows. Another dimension which affects the sensitivity is the length of the feedback channels—the shorter they are the greater the sensitivity, and directing the channels out of the common plane enables them to be shorter than channels which have to extend around the outlet channels in the common plane. This arrangement also facilitates bleeding air from the feedback channels.

We have found from considerable experimentation that a vortex forms in the volume in front of the splitter. The direction of rotation of this vortex changes as the fluid changes direction in moving between the sides of the splitter. Another optional feature of the present invention encourages the formation and stability of this vortex by providing a recess in the nose of the splitter. Various shapes of recess may be used; the best shape we have found is a smoothly curved recess merging by smoothly curved boundaries into the rest of the splitter. The depth of the recess is preferably of the same order as half the width of the nozzle.

Examples of the invention will now be described with reference to the accompanying drawings in which:

FIG. 1 is a section through a flowmeter in the plane of the majority of the components;

FIG. 2 is a transverse section on the centre line of the flowmeter;

FIG. 3 shows a fluid flow in the two states of the flowmeter;

FIGS. 6A and 6B show alternative constructions of the nozzle of the flowmeter of FIG. 1;

FIG. 7 is a perspective view of a detector in the flowmeter of FIG. 1;

FIG. 8 is a section similar to that of FIG. 1 of an alternative flowmeter;

FIG. 9 is a transverse section on the centre line of the flowmeter of FIG. 8; and FIG. 10 shows various significant parameters of the apparatus.

Figure 4A:
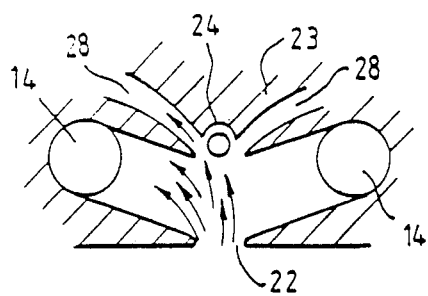
FIG. 4 shows in (a) to (e) the transition between the two states of FIG. 3.

Referring to FIGS. 1 to 4, the flowmeter comprises a plain cover plate 11 and baseplate 12, fluid flow passages being formed in the upper surface region of the baseplate 12 together with inlet and outlet passages 13 and 14 which extend through the whole depth of the base plate 12.

The flowmeter is symmetrical about the centre line 15, on which is located an inlet 21, a nozzle 22 and a dividing splitter 23 formed with a recess 24 in the end facing the nozzle, the side walls of the splitter curving smoothly into the recess which itself is smoothly curved. The depth of the recess is approximately equal to half the width of the nozzle. Between the nozzle 22 and the splitter 23 the regions on either side of the centre line 15 are divided by a C-shaped wall 27 into an outer passage which forms a feedback channel 28 and an inner region 29 which leads to the oulet passage 14 extending through the depth of the baseplate to an outlet 31 common to the two sides of the flowmeter. The apex 53 of each C-shaped wall adjacent the splitter is located forwardly of the splitter and is spaced outwards from it, and the outer surfaces of the C-shaped walls thus form effective extensions of the recess walls. The feedback channels 28 pass around the outlet passages 14 to their own outlets 19 directed across the jet from the nozzle 22.

Fluid flows through the whole depth of the baseplate in the inlet passage 13 round an elbow to a first chamber 21 in the upper surface region. The presence of the elbow helps smooth out disturbances in the flow upstream of the meter, and is included although there is no obstruction preventing the inlet passages lying entirely in the common plane of most of the other components.

The fluid flows along the centre line of the flowmeter from the chamber 26 through the nozzle 22 and is divided by the splitter 23. When fluid from the nozzle 22 passes preferentially to one side of the splitter 23, a vortex is formed in one direction within the recess 24 and the extended region defined by the adjacent ends of the C-shaped walls 27 and pressure builds up preferentially at the outlet 19 of the corresponding feedback channel 28, tending to urge fluid emerging from the nozzle towards the other side of the splitter and reversing the state of the flowmeter. The states oscillate and the frequency of oscillation is a measure of the flow rate. Manometer tubes leading from the feedback channels or pressure transducers (see FIG. 7) in the feedback channels respond to the pressure changes and can be calibrated to indicate fluid flow from the measured frequency. The present design has been found to give a linear relationship between pressure variation frequency and fluid flow even at low flow rates. The use of transducers in this way avoids problems from gas bubbles or impurities in the manometer tubes, requiring bleeding or cleaning. The pressure transducers can be replaced by flow transducers and a flow transducer may instead be located in the recess 24 to register the reversal of the vortices. A flow transducer may use the time of flight or the Doppler effect of the flow on an ultrasonic beam or may measure the heat lost to or gained from the flowing fluid.

The vortex operation will now be described.

Considering first the case of a conventional convex "nose" portion on the splitter. As the jet is pushed over from one side of the flow passage to the other an increasing pressure is generated at the nose. This pressure reaches a maximum at the centre line of the nose portion. Most of the fluid has therefore to be directed against the relatively high stagnation pressure at this point. Thus to switch the jet across the passage, the energy required in the feedback pulse is relatively high.

If the case of a recessed nose splitter is now considered the following observations can be made.

The "stagnation point" for flow impinging on a vortex is not located at the centre line.

The circulation of flow around the vortex must generate a "Magnus effect" force tending to move the vortex in a direction which will cause it to block the previously active feedback passage. The vortex has been observed moving in this manner at flow rates as low as 2 liters/hour, corresponding to a Reynolds number of 50.

Figure 4B:
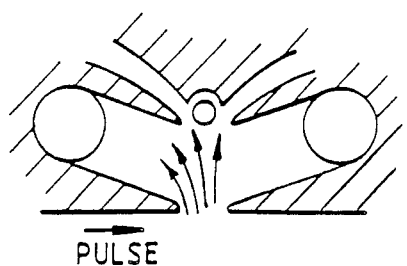
Figure 4C:
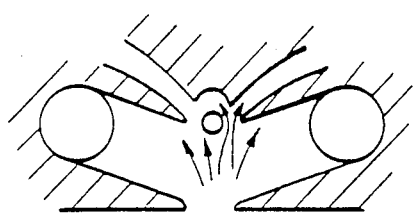
Figure 4D:
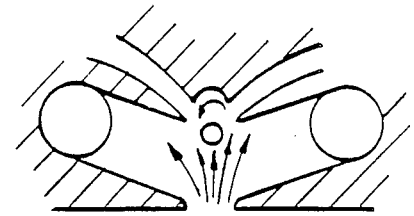
Figure 4E:
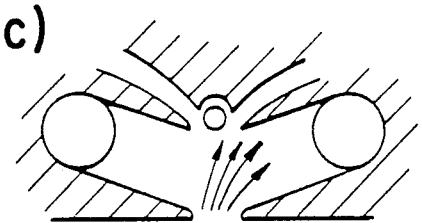

FIG. 4A to FIG. 4E show the transition from fluid flow passing preferentially on one side of the splitter 23 to flow passing the other side of the splitter. In FIG. 4A, fluid flows preferentially to the left of the splitter 23 forming a clockwise vortex in the recess 24. Fluid flowing around the left hand feedback conduit 28 provides increased pressure at its outlet as shown in FIG. 4B, thus urging the fluid flowing from the nozzle to the right which can be seen to be happening in FIG. 4C, reversing the vortex as shown in FIG. 4D and causing fluid to flow preferentially into the right hand feedback conduit as shown in FIG. 4E.

Figure 5:
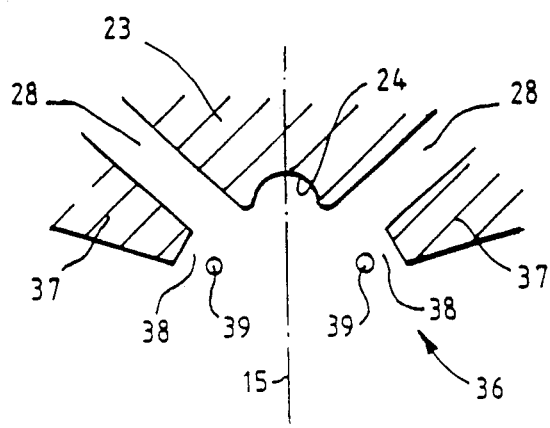
FIG. 5 shows an alternative construction of part of the apparatus of FIG. 1.

The ends of the C-shaped walls adjacent the recess are shown as sharp projections in FIGS. 1 to 4. FIG. 5 shows an alternative arrangement where a pin 39 (normal to the common plane) forms the apex followed after a small space 38 by a blunter-ended portion 37 forming the remainder of the projection and this has been found to work satisfactorily. The pins 39 serve to define the extensions of the recess walls in the same way as the solid C-shaped walls of FIGS. 1 to 4.

FIGS. 6A and 6B show alternative nozzles; FIG. 6A is quadrant shaped on its inlet side. The inlet chamber in the upper surface region of the baseplate 12 is parallel sided up to the nozzle, the nozzle width being of approximately one quarter the width of the inlet passage and being formed with inlet surfaces which are quadrants of a circle 34 as shown in the detail of FIG. 6A. FIG. 6B shows a nozzle which has an initial tapering portion 51 leading into a parallel sided portion 52. Flowmeters with these shapes of orifice have been found to provide improved linearity between pressure variations and fluid flow at low flow rates.

FIG. 7 shows a pressure transducer in the form of a strip of piezo-electric material 32 on the wall of the splitter adjacent its apex, connected by cables 33 to the detection and indication system, the cables transmitting voltage variations in the piezo-electric material caused by pressure variations in the fluid flow to the detection and indication system. The signal from the piezo-electric material 32 passes through an analogue/digital converter to a pulse counter and then to flow rate indicator, all the components being powered from an external power source and preferably formed as an integrated circuit. In an alternative arrangement, the signal from the piezo-electric material 32 is passed through an amplifier to an electro-magnetic pulse counter and indicator and from there to an energy store which provides power for the amplifier on demand.

In the alternative embodiment of FIGS. 8 and 9, the flowmeter has an inlet 21 and an outlet 31A on the central axis and most of the components are in the axial plane. There is the median plane normal to the figure and the axial plane is in the plane of the figure and transverse to the median plane. Only the feedback conduits 28A extend out of the axial plane (i.e. they have an extent normal to the axial plane), taking fluid flow from either side of the splitter 23 out of the axial plane and back to the axial plane in the region of the nozzle, the outlets of the feedback conduits 28A extending transversely to the nozzle 22 as in the previously described embodiment. This arrangement enables the two feedback conduits 28A to run parallel to each other at 35 in a plane displaced from the axial plane, separated by a differential pressure transducer 36 which registers the differential pressure between the conduits directly. Furthermore the displacement of the feedback conduits 28A out of the axial plane enables the outlet passages 14A to be kept in the axial plane and the feedback conduits 28A to be shorter than conduits which pass right around the outlet passages, thus increasing the frequency of oscillation for a given flow rate. The embodiment of FIG. 8 is preferred to that of FIGS. 1 to 4.

FIG. 10 shows various parameters of the apparatus; a is the axial distance from the nozzle to the lips of the recess; c is the axial distance from the nozzle to the end (which may be the pin 17) of the C-shaped wall adjacent the recess; d is the nozzle width. In all the embodiments, a is greater than c. The factor of $(a-c)/d$ is preferably at least 1 and preferably at most 4. The factor $c/d$ is preferably at least 5.8 and preferably below 12.

The invention is of particular application to heat meters, where the flow of heat is indicated by the measurements already described and the measurement of the temperature differential of the flowing fluid.

I claim:

1. A fluid flowmeter comprising a chamber having a centreline (15), an inlet nozzle (22) directed along the centreline for the fluid whose flow is to be measured, a splitter (23) located on the centreline and having an apex (24) facing the nozzle, each side of the chamber on each side of a median plane including the centre line being divided into a feedback channel (28) and an outlet channel (29,14) with an apex (24) therebetween, the feedback channel (28) extending from the apex (24) of the splitter to a location (19) beside the mouth of the nozzle, characterised in that the distance (a) from the mouth of the nozzle (22) to the splitter (23) is greater than the distance (c) from the mouth of the nozzle to the apex (53) between the feedback channel and the outlet channel.

2. A flowmeter as claimed in claim 1 wherein the difference of the distances is greater than the width (d) of the nozzle.

3. A flowmeter as claimed in claim 2 wherein the difference of the distances (a−c) is not greater than four times the width (d) of the nozzle.

4. A flowmeter as claimed in claim 3 wherein the feedback channels extend in a direction normal to a second plane through the centre line transverse to the median plane.

5. A flowmeter as claimed in claim 4 wherein the outlet channels extend only along the second plane.

6. A flowmeter as claimed in claim 5 comprising a recess (24) in the end of the splitter facing the nozzle.

7. A flowmeter as claimed in claim 6 wherein the recess has a smoothly curved wall.

8. A flowmeter as claimed in claim 7 wherein the wall of the recess curves smoothly into the sides of the splitter.

9. A flowmeter as claimed in claim 8 wherein the depth of the recess is equal to half the width of the nozzle.

10. A flowmeter as claimed in any one of claims 1 to 9 wherein the feedback channels are formed with C-shaped walls and the apices of the C-shaped walls each comprises a pin (39) spaced from the remainder (37) of the wall.

* * * * *